US008346176B2

(12) United States Patent
Xin et al.

(10) Patent No.: US 8,346,176 B2
(45) Date of Patent: Jan. 1, 2013

(54) SEQUENTIAL SENSING SCHEME FOR COGNITIVE RADIO

(75) Inventors: Yan Xin, Princeton, NJ (US); Honghai Zhang, Trenton, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 315 days.

(21) Appl. No.: 12/718,422

(22) Filed: Mar. 5, 2010

(65) Prior Publication Data

US 2011/0086602 A1  Apr. 14, 2011

Related U.S. Application Data

(60) Provisional application No. 61/162,866, filed on Mar. 24, 2009.

(51) Int. Cl.
*H04B 17/00* (2006.01)
(52) U.S. Cl. ............... 455/67.11; 455/63.11; 455/161.2
(58) Field of Classification Search ............... 455/67.11, 455/161.2
See application file for complete search history.

(56) References Cited

U.S. PATENT DOCUMENTS

2008/0150625 A1 *  6/2008  Sundstrom .................. 327/551

OTHER PUBLICATIONS

Kundargi, N., et al. "Hierarchical Sequential Detection in the Context of Dynamic Spectrum Access for Cognitive Radios" In Proceedings IEEE 14th International Conference on Electronics, Circuits and Systems. Dec. 2007. pp. 514-517.
Pollock. "Efficient Recursions for Truncation of the SPRT" Technical Report No. 85-24. Department of Industrial and Operations Engineering. Aug. 1985. (13 Pages).
Tandra, R., et al. "SNR Walls for Signal Detection" IEEE Journal of Selected Topics in Signal Processing. vol. 2, No. 1. Feb. 2008. pp. 4-17.
Wald. "Sequential Tests of Statistical Hypotheses" The Annals of Mathematical Statistics. vol. 17. 1945. pp. 117-186.
Xin, Y., et al. "SSCT: A Simple Sequential Spectrum Sensing Scheme for Cognitive Radio" IEEE Globecom 2009. Nov. 2009. (6 Pages).

* cited by examiner

*Primary Examiner* — Lana N Le
*Assistant Examiner* — Hsin-Chun Liao
(74) *Attorney, Agent, or Firm* — Joseph Kolodka; James Bitetto (57) ABSTRACT

A method and system for determining whether a given electromagnetic frequency is in use. An incoming signal is sampled and a test statistic is calculated based on the magnitude of the received samples and a predetermined constant. A determination is then made regarding whether the frequency is in use, based on whether the test statistic has exceeded a threshold.

18 Claims, 5 Drawing Sheets

SEQUENTIAL SENSING SCHEME FOR COGNITIVE RADIO

RELATED APPLICATION INFORMATION

This application claims priority to provisional application Ser. No. 61/162,866 filed on Mar. 24, 2009, incorporated herein by reference.

BACKGROUND

1. Technical Field

The present invention relates to cognitive radio and, more particularly, to systems and methods for determining whether a given spectrum band is unoccupied.

2. Description of the Related Art

Cognitive radio (CR) that supports secondary (unlicensed) users to access licensed spectrum bands not being currently occupied can dramatically improve spectrum utilization. Since the licensed (primary) users are prior to the secondary users (SUs) in utilizing the spectrum, the secondary and opportunistic access to licensed spectrum bands is only allowed to have negligible probability of deteriorating the quality of service of the primary users (PUs). Spectrum sensing performed by the secondary users to detect the unoccupied spectrum bands, is an important step in meeting this requirement.

Several spectrum sensing schemes, such as matched-filter detection, energy detection, and cyclostationary detection, have been proposed and investigated. Among these sensing schemes, energy detection does not rely on any deterministic knowledge about the primary signals and has low complexity. However, energy detection entails considerable amount of sensing time at the low detection signal-to-noise ratio (SNR) level, e.g., the sensing time is inversely proportional to $SNR^2$. To overcome this shortcoming, another sensing scheme, the sequential probability ratio test (SPRT), has been proposed for CR.

The SPRT has been widely used in many scientific and engineering fields since it was introduced in the 1940s. For given detection error probabilities, the SPRT requires a small average sample number for testing simple hypotheses. However, the SPRT-based sensing schemes proposed to date have several potential drawbacks: First, SPRT needs deterministic information or the statistical distribution of certain parameters of the primary signals. Acquiring such deterministic information or statistical distributions is practically difficult. Secondly, when the primary signals are taken from a finite alphabet, the test statistic of the SPRT based sensing scheme involves a special function, which incurs high implementation complexity. Thirdly, SPRT adopts the Wald's choice on the thresholds. However, the Wald's choice, which works well for the non-truncated SPRT, increases error probabilities when applied for the truncated SPRT.

SUMMARY

The present principles disclose a sequential spectrum sensing scheme having a simple test statistic. Using the test statistic, determinations may be rapidly made regarding whether a given frequency is already in use. In addition, the scheme does not require any deterministic knowledge about the primary signals and is of low implementation complexity.

A method for determining whether a given electromagnetic frequency is in use is shown that includes applying a transformation to an amplitude of received samples, adjusting the transformed samples by a constant based on a minimum detection signal-to-noise ratio, combining the adjusted samples to produce a test statistic, and using a processor to make a determination regarding whether the frequency is in use based on whether the test statistic has exceeded or has fallen below a threshold.

A system for determining whether a given electromagnetic frequency is in use is also shown that includes a transformation module configured to transform an amplitude of received samples, an adjustment module configured to adjust the transformed samples by a constant based on a minimum detection signal-to-noise ratio and to combine the adjusted samples to produce a test statistic, and a test module configured to use make a determination using a processor as to whether the frequency is in use based on whether the test statistic has exceeded or has fallen below a threshold.

A computer readable medium storing a computer readable program is further shown, such that the computer program causes the computer to calculate a test statistic based on the magnitude of a set of received samples and a predetermined constant and make a determination regarding whether a frequency is in use based on whether the test statistic has exceeded or has fallen below a threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
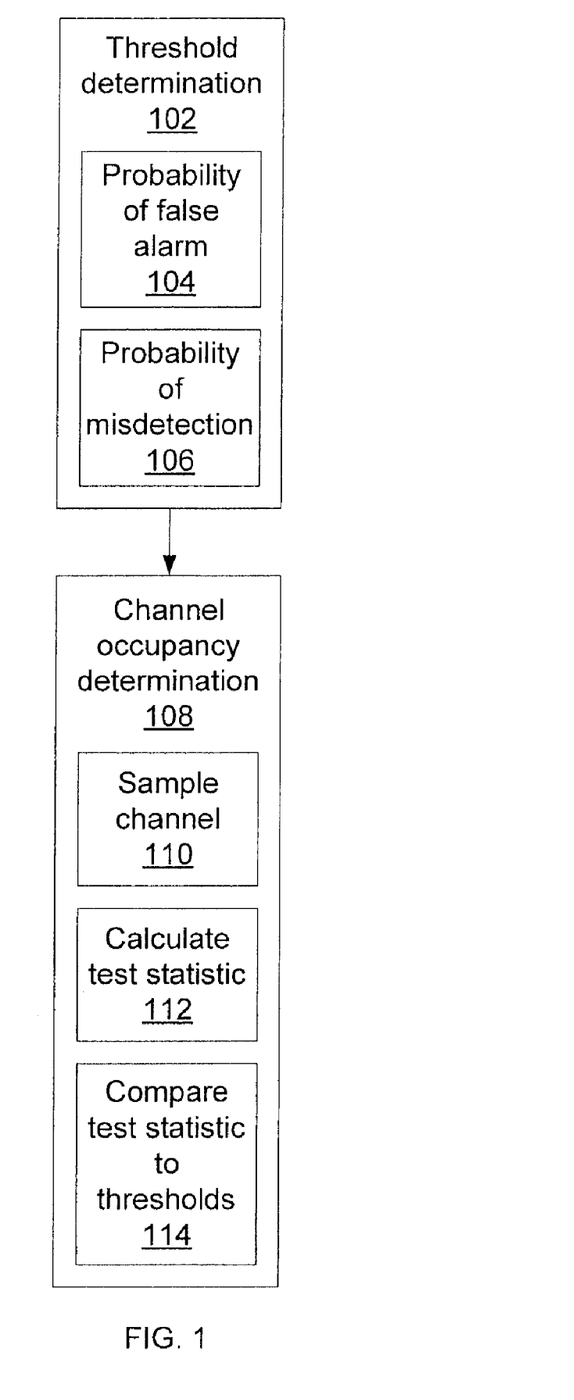
FIG. 1 shows a block/flow diagram that illustrates an illustrative embodiment of the present principles.

Cognitive radio (CR) supports secondary and opportunistic access to licensed spectrum to improve spectrum utilization. The present principles are directed to a truncated, sequential sensing scheme having a simple test statistic. The present principles deliver a considerable reduction in average sensing time needed to determine whether a given band is unoccupied, while maintaining detection performance that is comparable to prior art techniques. Referring to FIG. 1, a general outline of the present principles is shown. First, appropriate thresholds are determined 102 that produce suitable probabilities of false alarm 104 and of misdetection 106 according to design specifications. Next, channel occupancy is determined 108. Determining whether a given band is occupied involves first sampling the channel 110. A test statistic is then calculated based on said samples 112, and is compared to the above-described thresholds 114 to produce an occupancy determination.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

The following disclosure makes use of the following notation. Upper boldface and low boldface letters are used to denote matrices and vectors, respectively; $I_M$ denotes an M×M identity matrix; $E[\cdot]$ denotes the expectation operator; $(\cdot)^T$ denotes the transpose operation; $N_p^q$ denote a set of consecutive integers from p to q, $N_p^q:=\{p,p+1,\ldots,q\}$, where p is a non-negative integer and q is a positive integer or infinity; $I_{\{x \geq 0\}}$ denotes an indicator function defined as $I_{\{x \geq 0\}}=1$ if $x \geq 0$ and $I_{\{x \geq 0\}}=0$ if $x<0$.

Consider a narrow-band CR communication system having a single secondary user (SU). The SU shares the same spectrum with a single primary user (PU) and needs to detect the presence/absence of the PU to determine whether it is permissible to use the spectrum. This is shown as block 108 in FIG. 1. Detecting for the primary signals is formulated as a binary hypothesis testing problem as $$H_0 : r_i = w_i, i=1,2,\ldots, \text{ad inf initum} \quad (1)$$

$$H_1 : r_i = s_i + w_i, i=1,2,\ldots, \text{ad inf initum} \quad (2)$$

where r is the signal received by the SU at time instant i, $w_i$ is additive white Gaussian noise, $s_i$ is the transmitted signal of the PU, and $H_0$ and $H_1$ denote the null and alternative hypotheses, respectively. It may be further assumed that
1) $w_i$s are modeled as independent and identically distributed (i.i.d.) complex Gaussian random variables (RVs) with means zero and variances $\sigma_w^2$, i.e., $w_i \sim CN(0, \sigma_s^2)$;
2) the primary signal samples $s_i$ are i.i.d.;
3) $w_i$ and $s_i$ are statistically independent; and
4) the perfect knowledge on the noise variance $\sigma_w^2$ is available at the SU.

The same assumptions have been made in energy detection. In practice, the noise variance $\sigma_w^2$ can be known a priori by an appropriate measurement. In energy detection, the energy of the received signal samples is first computed and then is compared to a predetermined threshold. The test procedure of energy detection is given as $$T(r) = \frac{1}{M} \sum_{i=1}^{M} |r_i|^2 \underset{H_0}{\overset{H_1}{\gtrless}} \kappa$$

where $r:=[r_1, r_2, \ldots, r_M]$, T(r) denotes the test statistic, M represents the number of samples available for making a decision, and κ denotes a threshold for energy detection.

One principal advantage for energy detection is that, in its sensing process, energy detection requires no deterministic knowledge of the primary signals and thus is known as a form of non-coherent detection. On the other hand, one major drawback of energy detection is that, at the low detection SNR level, it requires a large sensing period. For energy detection, the number of sensing samples increases on the order of $SNR^{-2}$ as SNR decreases.

To solve this problem, a simple sequential detection scheme may be used, having the following statistic, $$\Lambda_N = \sum_{i=1}^{N} (|r_i|^2 - \Delta) \quad (3)$$

where $\Delta$ is a predetermined constant. Calculation of the test statistic is shown as block 112 in FIG. 1. The parameter $\Delta$ satisfies $\sigma_w^2 < \Delta < \sigma_w^2(1+SNR_m)$ with $SNR_m$ denoting the minimum detection SNR. Assuming that the detector needs to make a decision with M samples, the following testing procedure applies, shown as block 114 in FIG. 1:

Reject $H_0$:

$$\text{if } \Lambda_N \geq b \text{ and } N \leq M-1 \text{ or if } \Lambda_M \geq \gamma; \quad (4)$$

Accept $H_0$:

$$\text{if } \Lambda \geq a \text{ and } N \leq M-1 \text{ or if } \Lambda_M \geq \gamma; \quad (5)$$

Figure 5:
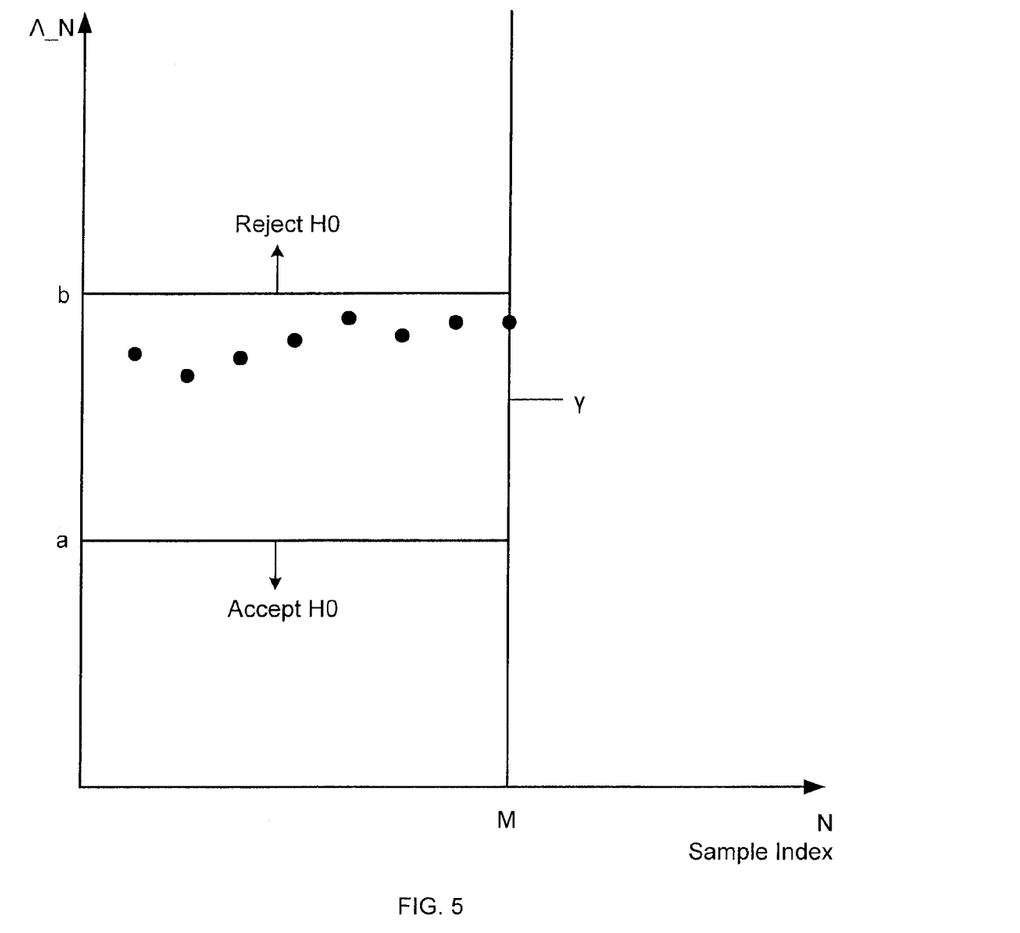
FIG. 5 shows a graph that illustrates how the test statistic for received samples is used to determine whether a frequency is in use.

Continue Sensing:

$$\text{if } \Lambda_N \in (a,b) \text{ and } N \leq M-1 \quad (6)$$

where a, b, and γ are three predetermined thresholds with a<0, b>0, and a<γ<b, and M is the truncated size of the test. Since each term in the cumulative sum $\Lambda_N$ is a shifted squared random variable (RV), the test procedure (4)-(6) is termed the sequential shift chi-square test (SSCT). In statistical terms, the SSCT is a truncated sequential test. Referring now to FIG. 5, an exemplary test region of the SSCT is shown which includes two stopping boundaries: the lower- and upper-boundary labeled "a" and "b" respectively. The vertical axis represents the value of the test statistic after a given sample, while the horizontal axis represents the index of a given sample. The γ threshold is employed when the number of received samples reaches M and no decision has been made at or before the $M^{th}$ sample.

It is evident from (4)-(6) that the test statistic depends only on the amplitudes of the received samples and the constant $\Delta$. As will be shown below, the choice of the constant $\Delta$ depends on the minimum detection SNR instead of the exact operating SNR value, which is typically difficult to obtain in practice. To distinguish these two different SNRs, we denote the operating SNR as $SNR_o$.

Normalizing $\Lambda_N$ by $\sigma_w^2/2$, equation (3) can be rewritten as $$\bar{\Lambda}_N = \sum_{i=1}^{N} (v_i - 2\Delta/\sigma_w^2) \quad (7)$$

where $\bar{\Lambda}_N := 2\Lambda_N/\sigma_w^2$ and $v_i := 2|r_i|^2/\sigma_w^2$. Let $\xi_N$ denote the sum of $v_i$ for $i=1, \ldots, N$, i.e., $$\xi_N = \sum_{i=1}^{N} v_i$$

and let $\bar{\Delta}$ denote $2\Delta/\sigma_w^2$. With this notation, $\Lambda_N$ can be rewritten as $$\Lambda_N = \xi_N - \bar{\Delta} \quad (8)$$

For notional convenience, $\Lambda_0$ and $\xi_0$ are defined as zero. Let $a_i$ and $b_i$ be two parameters defined as follows: $a_i=0$ for $N_0^P$, $a_i=\bar{a}+i\bar{\Delta}$ for $i \in N_{P+1}^{+\infty}$, and $b_i=\bar{b}+i\bar{\Delta}$ for $b \in N_0^{+\infty}$, where $\bar{a}:=2a/\sigma_w^2$ and P denotes the largest integer less than or equal to $-a/\Delta$, i.e., $P:=\lfloor -a/\Delta \rfloor$. Applying the preceding transformation (8), (4)-(6) can be rewritten as Reject $H_0$:

if $\xi_N \geq b_N$ and $N \leq M-1$ or if $\xi_M \geq \bar{\gamma}_M$; (9)

Accept $H_0$:

if $\xi_N \geq a_N$ and $N \leq M-1$ or if $\xi_M \geq \bar{\gamma}_M$; (10)

Continue Sensing:

if $\xi_N \in (a_N, b_N)$ and $N \leq M-1$ (11)

where $\bar{\gamma}_M = \bar{\gamma} + M\bar{\Delta}$ with $\bar{\gamma} = 2\gamma/\sigma_w^2$. Clearly then, $a_M < \bar{\gamma}_M < b_M$. $P_{FA,M}$ and $P_{MD,M}$ are defined as false-alarm and misdetection probabilities, respectively.

It should be noted that the SSCT is not merely an SPRT. In the non-truncated SPRT case, the Wald's choice on thresholds which yield a test satisfying specified false-alarm and misdetection probabilities is not applicable. Alternatively, the thresholds a, b, and $\gamma$, and a truncated size M are selected beforehand, either purposefully or randomly, and corresponding $P_{FA,M}$ and $P_{MD,M}$ are then computed. This procedure is indicated as block 102 in FIG. 1 and, with more detail, as FIG. 4. These probabilities characterize the effectiveness of a given set of thresholds. If the probabilities are extremely below a desired margin of error, the thresholds should be adjusted in order to decrease the sensing time. If the probabilities are higher than design specifications permit, the thresholds should be adjusted to decrease the probability of error.

If the resulting $P_{FA,M}$ and $P_{MD,M}$ do not meet design specifications, the thresholds and truncated size are subsequently adjusted. Such process continues until desirable error probability performance is obtained. In the above process, it is important to efficiently and accurately evaluate false-alarm and misdetection probabilities for prescribed thresholds a, b, and $\gamma$, and a truncated size M, as is discussed below.

An exact formulation for false-alarm probability can be derived according to the present principles, and an iterative method is shown to compute misdetection probabilities. In describing these probabilities, the following definitions become useful:

$$f_{\chi_k}^{(k)}(\xi) = \int_{\chi_k}^{\xi} d\xi_k \int_{\chi_{k-1}}^{\xi_k} d\xi_{k-1} \ldots \int_{\chi_1}^{\xi_2} d\xi_1, \quad k \geq 1, \quad (12)$$

with the initial condition $f_{\chi_k}^{(k)}(\xi) = 1$, $k=0$, where $\chi_0 = \emptyset$ and $\chi_k := [\lambda_1, \ldots, \lambda_{k-1}, \chi_k]$ with $0 \leq \lambda_1 \leq \ldots \leq \lambda_k$. Superscript k and subscript $\chi_k$ are used to indicate that $f_{\chi_k}^{(k)}(\xi)$ is a k-fold multiple integral with ordered lower limits specified by $\chi_k$. It can be shown that the exact value of $f_{\chi_k}^{(k)}(\xi)$ can be obtained recursively. A second helpful integral is defined as:

$$I^{(0)} := 1, \text{ and } I^{(n)} := \int_{\Omega^{(n)}} \ldots \int d\xi_n, \quad n \geq 1 \quad (13)$$

where $\xi_n := [\xi_1, \xi_2, \ldots \xi_n]$ with $0 \leq \xi_1 \leq \xi_2 \ldots \leq \xi_n$ and $\Omega^{(n)} = \{(\xi_1, \xi_2, \ldots, \xi_n) : 0 \leq \xi_1 \leq \ldots \leq \xi_n, a_i < \xi_i, a_i < \xi_i < b_i, i \in N_1^n\}$. In particular, when $n=1$, $$I^{(1)} = \int_{a_1}^{b_1} d\xi_1 = b_1 - a_1.$$

Let c and d denote two positive real numbers with $c < d$, $a_{N-1} \leq c \leq b_N$, and $a_N < d$. Then, $$\psi_{n,c}^N = \begin{cases} [\underbrace{b_{n+1}, \ldots, b_{n+1}}_{Q}, \underbrace{a_{Q+n+1}, \ldots, a_{N-1}}_{N-Q-n}, c], n \in N_0^{N-Q-2} \\ [\underbrace{b_{n+1}, \ldots, b_{n+1}}_{N-n}, c], n \in N_{N-Q-1}^{s-1} \\ b_{n+1} 1_{N-n}, n \in N_s^{N-2} \end{cases}$$

where s denotes the integer such that $b_s < c \leq b_{s+1}$, Q denotes the integer such that $a_Q < b_1 \leq a_{Q+1}$, and $N \geq 2$. Let $A_i$ be an $(N-n) \times (N-n-i)$ matrix defined as $A_i = [I_{N-i-n} | 0_{i \times (N-i-n)}]^T$ with $i \in N_1^N$. Furthermore: $\psi_{n,c}^{N-i} = \psi_{n,c}^N \cdot A_i, i \in N_1^N$, and $a_{n_1}^{n_2} = [a_{n_1+1}, \ldots, a_{n_2}]$, where $\psi_{n,c}^{N-i}$ is a $(N-i-n) \times 1$ vector and $a_{n_1}^{n_2}$ is a $(n_1 - n_2) \times 1$ vector. In particular, $a_{n_1}^{n_2}$ is defined as $\phi$ if $n_1 \geq n_2$.

A third useful integral is defined as:

$$J_{c,d}^{(N)}(\theta) := \int_{Y_{c,d}^{(N)}} \ldots \int e^{-\theta \xi_N} d\xi_N \quad (14)$$

where $\theta > 0$, $N \geq 1$, and $$Y_{c,d}^{(N)} := \{(\xi_1, \ldots, \xi_N) : 0 \leq \xi_1 \leq \ldots \leq \xi_N, a_i < \xi_i < b_i, i \in N_1^{N-1}; c \leq \xi_N < d\}$$

and $\theta$ is a positive real number.

Using these integrals, it is possible to formulate a false-alarm probability, shown as block 104 in FIG. 1. Let $E_N$ denote the event that $\Lambda_N \geq b$ and $a < \Lambda_n < b$ for $n \in N_1^{N-1}$ under $H_0$, where $N \in N_1^{M-1}$, and let $E_M$ denote the event that $\Lambda_M \geq \gamma$ and $a < \Lambda_b < b$ for $n \in N_1^{M-1}$ under $H_0$. Denote by $P_{H_0}(E_N)$ the probability of the event $E_N$ under $H_0$, where $E_N$ represents the event that under $H_0$ the test statistic $\Lambda_N$ exceeds the upper boundary, where $N \in (1, M)$. The overall false-alarm event is a union of $E_N$ for $1 \leq N \leq M$. Recalling that the test procedure given in (5)-(6) is equivalent to that given in (10)-(11), one arrives at $$P_{H_0}(E_N) = \begin{cases} P_{H_0}(a_i < \xi_i < b_i, i \in N_1^{N-1}; \xi_N \geq b_N), N \in N_1^{M-1} \\ P_{H_0}(a_i < \xi_i < b_i, i \in N_1^{M-1}; \xi_M \geq \bar{\gamma}_M), N = M \end{cases} \quad (15)$$

The false-alarm probability $P_{FA,M}$ represents the likelihood that the SU will conclude that there is a PU on the channel, despite no such PU actually being present. $P_{FA,M}$ with truncated size M can be written as $$P_{FA,M} = \sum_{N=1}^{M} P_{H_0}(E_N).$$

Note that under $H_0$, $v_i$ is an exponentially distributed RV with rate parameter ½. The probability density function (PDF) of $v_i$ under $H_0$ is $p(v_i|H_0)=e^{-v_i/2}$, where $v_i>0$. Furthermore, the joint PDF of RVs $v_1, \ldots, v_N$ is given by $$P_{v|H_0}(v_1, \ldots, v_N) = 2^{-N} e^{-\sum_{i=1}^{N} \frac{v_i}{2}}, \quad v_i > 0, \quad (16)$$

where $v:=(v_1, \ldots, v_N)$. Due to $$\xi_N = \sum_{i=1}^{N} v_i,$$

the following transformation between $\xi_i$ and $v_i$: $v_1=\xi_1$ arises: $v_2=\xi_2-\xi_1, \ldots, \xi_N-\xi_{N-1}$.

By applying this function and equation (16), one arrives at $$p_{\xi|H_0}(\xi_1, \ldots, \xi_N) = 2^{-N} e^{-\frac{\xi_N}{2}}, 0 \le \xi_0 \le \xi_1 \le \ldots \le \xi_N \quad (17)$$

where $\xi:=(\xi_1, \xi_2, \ldots, \xi_N)$. According to equations (15), (17), and the definition of $Y_{b_N,\infty}^{(N)}$, one finds $$P_{H_0}(E_N) = P_{H_0}((\xi_1, \xi_2, \ldots, \xi_N) \in Y_{b_N,\infty}^{(N)}) \quad (18)$$
$$= 2^{-N} J_{b_N,\infty}^{(N)}(0.5), 1 \le N < M$$

and $$P_{H_0}(E_M) = P_{H_0}((\xi_1, \xi_2, \ldots, \xi_M) \in Y_{\gamma_M,\infty}^{(M)}) \quad (19)$$
$$= 2^{-N} J_{\gamma_M,\infty}^{(M)}(0.5).$$

Taking the above into account, the false-alarm probability, $P_{FA,M}$ is given by $$P_{FA,M} = \sum_{N=1}^{M} P_{H_0}(E_N),$$

where $P_{H_0}(E_N)$ can be recursively computed as $$P_{H_0}(E_N) =$$

$$\begin{cases} p_N \frac{b_1 b_N^{N-2}}{(N-1)!}, N \in N_1^{P+1} \\ p_N \left[ f_{a_0^{N-1}}^{(N-1)}(b_{N-1}) - I_{\{N \ge 3\}} \sum_{n=0}^{N-3} P_{H_0}(E_{n+1}) \times \frac{(b_{N-1}-b_{n+1})^{N-n-1} 2^n e^{b_{n+1}/2}}{(N-n-1)!} \right], N \in N_{P+2}^{Q+1} \\ p_N \left[ f_{a_0^{N-1}}^{(N-1)}(b_{N-1}) - \sum_{n=0}^{N-3} f_{\psi_{n,a_{N-1}}}^{(N-1-n)}(b_{N-1}) \times 2^n e^{\frac{b_{n+1}}{2}} P_{H_0}(E_{n+1}) \right], N \in N_{Q+2}^{M-1} \\ 2^{-M} J_{\gamma_M,\infty}^{(M)}(0.5), N = M \end{cases}$$

where $p_N=2^{-(N-1)}e^{-b_N/2}$.

A formulation for the misdetection probability, $P_{MD,M}$, is now presented, shown as block 106 in FIG. 1. The misdetection probability represents the likelihood that the SU will incorrectly conclude that there is no PU using the channel.

Unlike the false-alarm case, $v_i$ under $H_1$ is a non-central chi-square RV with two degrees of freedom and non-centrality parameter $\gamma=2|s_i|^2/\sigma_w^2$. Conditioned on $\lambda_i$, the PDF of $v_i$ under $H_1$ is given as $$p(v_i | H_1, \lambda_i) = \frac{1}{2} e^{-(v_i+\lambda_i)/2} I_0(\sqrt{\lambda_i v_i}), v_i > 0 \quad (20)$$

where $I_0(\cdot)$ is the zeroth-order modified Bessel function of the first kind.

To compute the misdetection probability, one must first obtain $p(v_i|H_1)$, as acquiring perfect knowledge of each $\lambda_i$ is typically infeasible except for constant-modulus primary signals. Alternatively, one can obtain $p(v_i|H_1)$ by applying the Bayesian approach to average over all the possible $\lambda_i$. This approach requires knowledge of the exact statistical distribution of the amplitude square of the primary signals, $|s_i|^2$. Obtaining such knowledge requires cooperation between the primary and second users. Like energy detection, the SSCT can obviate such a requirement due to the following properties:

(1) For a sufficiently large N, the statistical distribution of $\Lambda_N$ depends on the mean of $\lambda_i$, $i=1, \ldots, N$, irrespective of a specific choice of $\lambda_1, \ldots, \lambda_N$. Define $\rho_N:=b_N$ for $N \in N_1^{M-1}$ and $\rho_M:=\gamma_M$. Let $A_N^{l_N}$ denote the event that $a_i<\xi_i<b_i$, $i \in N_1^{l_N}$ for some integer $l_N \in N_1^N$ and let $\tilde{A}_N^{l_N}$ denote its counterpart for the constant-modulus case. Let $B_N^{l_N}$ denote the event that $\xi_N \ge \rho_N$, and $a_i < \xi_i < b_i$, $i \in N_{l_N+1}^N$ and let $\tilde{B}_N^{l_N}$ denote its counterpart in the constant modulus case.

(2) Let $\in$ be an arbitrary positive number. If for each N there exists a positive integer $l_N \in N_1^N$ such that $$P_{H_1}(A_N^{l_N}) \ge 1 - \frac{\varepsilon}{3M}, P_{H_1}(\tilde{A}_N^{l_N}) \ge 1 - \frac{\varepsilon}{3M},$$

$$|P_{H_1}(B_N^{l_N}) - P_{H_1}(\tilde{B}_N^{l_N})| < \frac{\varepsilon}{3M},$$

then $|P_{MD,M} - \tilde{P}_{MD,M}| \le \in$, where $l_N$ depends on the values of N and $\in$, and $\tilde{P}_{MD,M}$ denotes the miss-detection probability obtained by assuming constant modulus signals (i.e., when all $\lambda_i$ are equal).

With these properties, it is reasonable to assume that all $\lambda_i$ are equal to $\lambda$ by allowing negligible errors when M is not sufficiently large.

In this case, one can employ an efficient computational method to recursively compute $P_{MD,M}$. Defining $u_i = v_i - \bar{\Delta}$, $\bar{\Lambda}_N$ is rewritten as $$\bar{\Lambda}_N = \sum_{i=1}^{N} u_i.$$

Clearly, the PDF of $u_i$ under $H_1$ may be rewritten as $$p(v_i | H_1) = \frac{1}{2} e^{-(u_i + \bar{\Delta} + \lambda_i)} I_0\left(\sqrt{\lambda_i(u_i + \bar{\Delta})}\right), u_i > -\bar{\Delta}$$

Recall that M is the maximum number of samples to observe. Denote $\bar{\Lambda}_{M-k}$ by $t_k$. Let $G_k(t_k)$ denote the misdetection probability of the SSCT conditioning on that the first (M−k) samples have been observed, the present value $t_k = \bar{\Lambda}_{M-k}$, and the test statistics have not crossed either boundary in the previous (M−k−1) samples. If $\bar{a} < t_k < \bar{b}$, an additional sample (the (M−k+1)th sample) is needed. Let u be the next observed value of $u_i$. The conditional probability $G_k(t_k|u)$ can be readily obtained as $$G_k(t_k | u) = \begin{cases} 0 & \text{if } u > \bar{b} - t_k \\ 1 & \text{if } u < \bar{a} - t_k \\ G_{k-1}(t_k + u) & \text{if } \bar{a} - t_k < u < \bar{b} - t_k \end{cases} \quad (21)$$

Using (21), one can recursively compute $G_k(t_k)$ as $$G_k(t_k) = \int_{-\infty}^{\bar{a}-t_k} p_{H_1}(u) du + \int_{\bar{a}-t_k}^{\bar{b}-t_k} G_{k-1}(t_k + u) p_{H_1}(u) du, \quad (22)$$

for $k=1, \ldots, M$ with the following initial condition:

$$G_0(t_0) = 0 \text{ if } t_0 \geq \bar{\gamma}; G_0(t_0) = 1, \text{ otherwise.} \quad (23)$$

Employing the above recursive process, one can obtain $G_M(0)$, which is equal to the misdetection probability, $P_{MD,M}$.

Another important quantity in the SSCT is the average sample number (ASN). The number of samples needed to yield a decision is an RV, denoted by $N_s$. The ASN can be written as $$E(N_s) = E_{H_0}(N_s) P_{H_0} + E_{H_1}(N_s) P_{H_1} \quad (24)$$

where $E_{H_i}(N_s)$ denotes the ASN conditioned on $H_i$ and $P(H_i)$ denotes the probability of hypothesis $H_i$ for $i=0,1$. Since $1 \leq N_s \leq M$, one can express $E_{H_i}(N_s)$ as $$E_{H_i}(N_s) = \sum_{N=1}^{M} N P_{H_i}(N_s = N), i = 0, 1, \quad (25)$$

where $P_{H_i}(N_s = N)$ is the conditional probability that the test ends at the N th sample under $H_i$. Equations (9)-(11) imply that $P_{H_i}(N_s = N)$ can be obtained as $$P_{H_i}(N_s = N) \stackrel{(a)}{=} P_{H_i}((\xi_1, \ldots, \xi_{N-1}) \in Y_{a_{N-1}, b_{N-1}}^{(N-1)}) - P_{H_i}((\xi_1, \ldots, \xi_N) \in Y_{a_N, b_N}^{(N)}), N \in N_1^{M-1} \quad (26)$$

$$P_{H_i}(N_s = M) \stackrel{(b)}{=} ((\xi_1, \ldots, \xi_{M-1}) \in Y_{a_{M-1}, b_{M-1}}^{(M-1)}), \quad (27)$$

where the two terms on the right-hand side of the equality 26 are the probabilities of the events that, under $H_i$, the test statistic does not cross either of two boundaries at or before samples N−1 and N for $N \in N_1^{M-1}$, respectively, and the term on the right-hand side of equality 27 denotes the probability that under $H_i$ (the condition where a PU is using the channel), the test statistic does not cross either boundary at or before samples N−1.

These probabilities can be expressed for each of the hypotheses as $$P_{H_0}(N_s = N) = 2^{-(N-1)} J_{a_{N-1}, b_{N-1}}^{(N-1)}(0.5) - 2^{-N} J_{a_N, b_N}^{(N)}(0.5)$$

$$P_{H_0}(N_s = M) = 2^{-(M-1)} J_{a_{M-1}, b_{M-1}}^{(M-1)}(0.5)$$

$$P_{H_1}(N_s = N) \stackrel{(c)}{=} P_{H_1}((\xi_1, \ldots, \xi_N) \notin \gamma_{a_N, b_N}^{(N)}) - P_{H_1}((\xi_1, \ldots, \xi_N) \notin \gamma_{a_{N-1}, b_N}^{(N-1)}) \quad (28)$$

$$P_{H_1}(N_s = M) \stackrel{(d)}{=} 1 - P_{H_1}((\xi_1, \ldots, \xi_N) \notin \gamma_{a_N, b_N}^{(N)}) \quad (29)$$

where the two terms on the right-hand side of equation 28 are the probabilities of the events that, under $H_1$, the test statistic crosses either of the two boundaries at or before samples N and N−1, respectively, and the second term on the right-hand side of equation 29 is the probability that the test statistic crosses either of the two boundaries at or before sample M.

According to equation (23), $G_k(t_k)$ also depends on $\bar{\gamma}$. With a slight abuse of notation, $G_k(t_k)$ is rewritten as $G_k(t_k, \bar{\gamma})$. Let $V_k$ denote the event that the test statistics cross the lower-boundary at or before sample k under $H_1$, and $U_k$ denote the event that the test statistics do not cross the upper-boundary at or before sample k under $H_1$. It is not hard to see $P_{H_1}(V_k) = G_k(0, \bar{a})$ and $P_{H_1}(U_k) = G_k(0, \bar{b})$. One can now obtain $$P_{H_1}((\xi_1, \ldots, \xi_N) \notin Y_{a_N, b_N}^{(N)}) G_N(0, \bar{a}) + 1 - G_N(0, \bar{b}), \quad (31)$$

where $G_N(t, \bar{a})$ and $G_N(t, \bar{b})$ can be recursively obtained by applying (22). After obtaining $P_{H_0}(N_s = N)$ and $P_{H_1}(N_s = N)$, one can readily compute $E(N_s)$ from (24) and (25).

As can be seen from the above, the SSCT scheme provides advantages over the prior art in that: 1) the test statistic is simple; 2) it does not need deterministic knowledge about the primary signals; 3) it can substantially reduce sensing time while maintaining a comparable detection performance as compared with energy detection; 4) and it offers desirable flexibility in striking the trade-off between detection performance and sensing time when $SNR_o$ mismatches with $SNR_m$.

Figure 2:
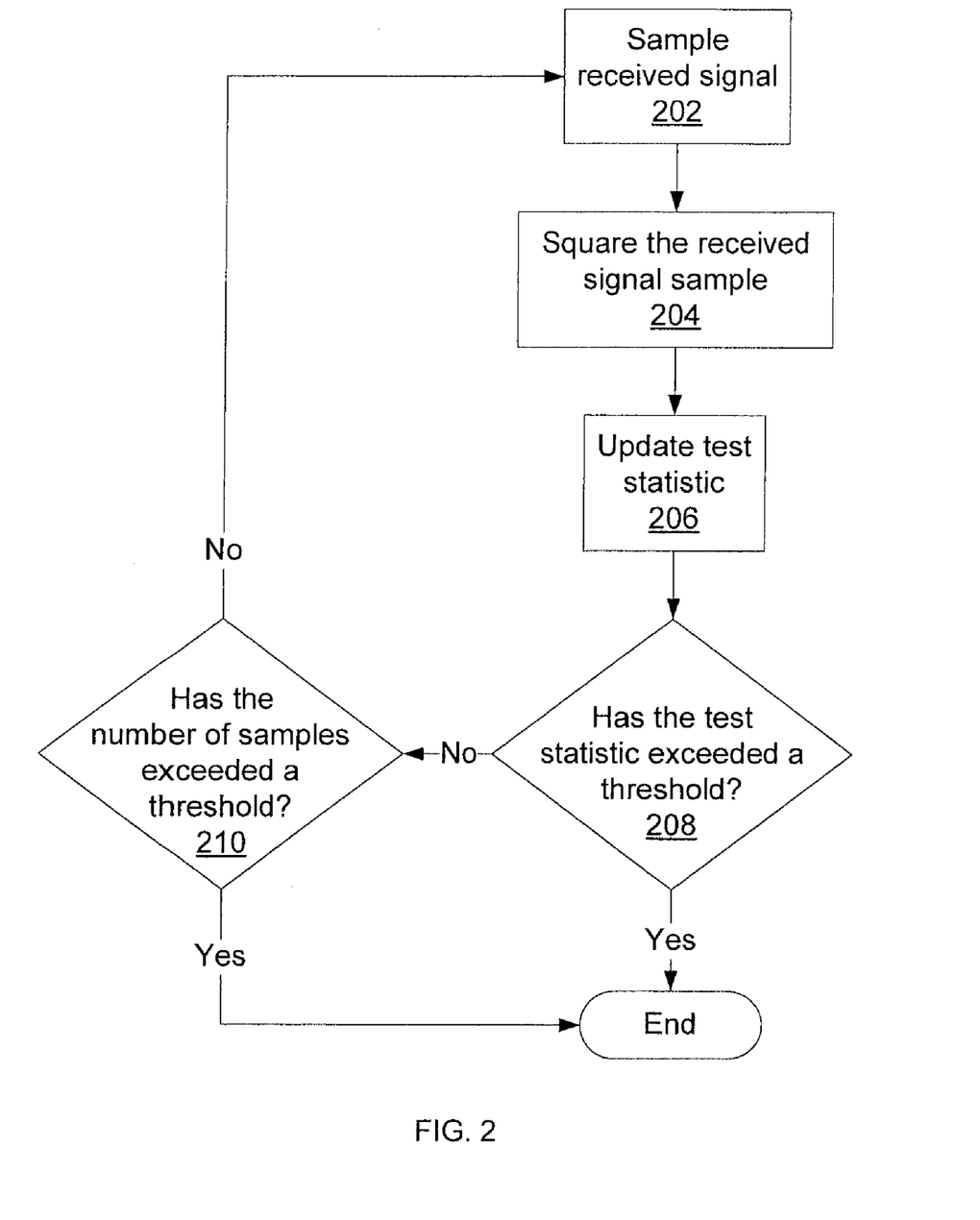
FIG. 2 shows a block/flow diagram illustrating an exemplary method for determining whether a frequency is in use according to the present principles.

Referring now to FIG. 2, a method is shown for determining whether a given spectrum is occupied. A received signal is sampled at block 202. This produces a value representing the strength of the signal at the time of sampling. The sample is then squared at block 204. This squared sample value is used to update the test statistic at block 206. As noted above, an exemplary test statistic according to the present principles is $$\Lambda_N = \sum_{i=1}^{N} (|r_i|^2 - \Delta),$$

where $\Delta$ is a constant and N represents the number of samples collected so far. The test statistic is then evaluated at block 208 to determine whether it exceeds the upper-boundary b or falls below the lower-boundary a, such that a determination is made regarding whether the spectrum is occupied. If a threshold is exceeded, the procedure ends with the information that the SU may or may not use the spectrum. Otherwise, the number of samples received is determined at block 210. If no decision has been made when that number reaches a maximum number of samples (described above as the quantity M), then the sensing stops and makes a decision by comparing the final test statistic $\Lambda_M$ with $\gamma$.

Figure 3:
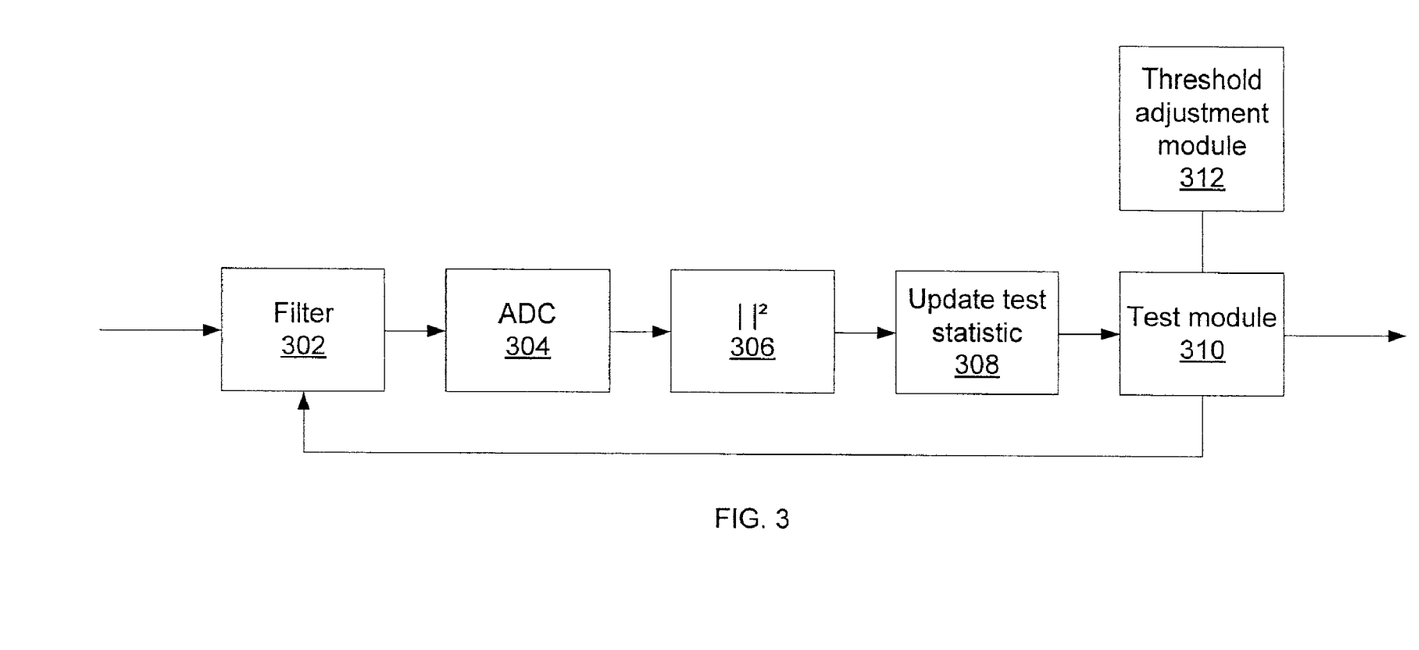
FIG. 3 shows a block/flow diagram illustrating an exemplary system for determining whether a frequency is in use according to the present principles.

Referring now to FIG. 3, a system is shown to make determinations regarding whether a spectrum is occupied. An incoming signal reaches filter 302, which removes out-of-band noise from the signal. An analog-to-digital converter (ADC) 304 then samples the signal, converting it from a continuous-time waveform to discrete-time signals. These discrete-time signals then pass through a squaring module 306, which outputs the square of the magnitude of its input. The squared samples pass through an update module 308, which updates the test statistic as described above. The update module 308 outputs the test statistic, which is then used by test module 310. The test module 310 determines whether the test statistic has exceeded a given threshold. The test module 310 also determines whether the number of samples used has reached the maximum allowable sample size M. If a threshold has been exceeded, the test module sends a signal to filter 302 indicating that the filter 302 should stop sensing the incoming signal. The test module then outputs the end result. The thresholds may be set and adjusted according to the procedure set forth below prior to beginning detection at threshold adjustment module 312.

The present principles involve the use of several thresholds. If the test statistic is below a threshold "a", then the present principles arrive at a determination that the spectrum is unoccupied. If the test statistic is above a second threshold "b", the present principles determine that the spectrum is occupied. A third threshold "$\gamma$" may be used to provide a determination for a final test statistic. A fourth threshold, "M," is selected as the maximum allowable sensing time.

Figure 4:
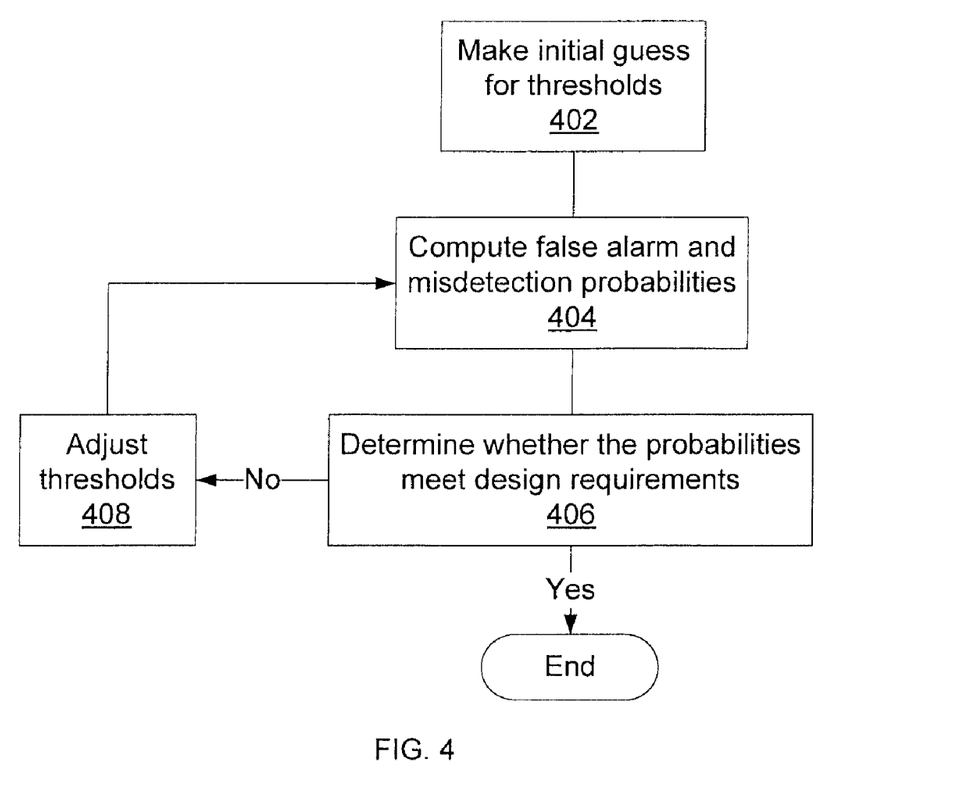
FIG. 4 shows a block/flow diagram illustrating an exemplary method for adjusting thresholds according to design specifications.

The thresholds "a," "b," and "$\gamma$" can be determined based on system design specifications. The values of these thresholds determine the probabilities for false-alarm and for misdetection. Referring now to FIG. 4, a technique for selecting the thresholds is shown. Block 402 begins by making initial guesses for the thresholds. The thresholds should obey a<0, b>0, and a<$\gamma$<b. Block 404 computes the false alarm and misdetection probabilities using, for example, the formulations described above. Block 406 determines whether the probabilities meet design specifications. If the obtained probabilities are much smaller than a set of target probabilities, the thresholds should be adjusted to improve the sensing time. On the other hand, if the obtained probabilities are larger than a set of target probabilities, the thresholds need to be adjusted to ensure that the target probability is satisfied. If the design specifications are not met, block 408 adjusts the thresholds and returns to block 404. If the design specifications are met, block 406 terminates and outputs the thresholds.

The thresholds may be adjusted on a trial-and-error basis. After a set of thresholds has been generated and the false-alarm and misdetection probabilities have been calculated, if the misdetection probability is larger than design specifications, the value of threshold a may be decreased, and vice versa. If the false alarm probability is larger than the design specifications, the value of threshold b may be increased. The difference between the two thresholds (b−a) is also considered.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining whether a given electromagnetic frequency is in use, comprising the steps of:
    applying a transformation to an amplitude of received samples;
    adjusting the transformed samples by a constant based on a minimum detection signal-to-noise ratio;
    combining the adjusted samples to produce a test statistic;
    using a processor to make a determination regarding whether the frequency is in use based on whether the test statistic has exceeded or has fallen below a threshold; and
    if a number of received samples reaches a maximum number of samples, making a determination regarding whether the frequency is in used based on whether the test statistic is above or below a final threshold.

2. The method of claim 1, wherein said step of adjusting comprises subtracting the constant from each transformed sample.

3. The method of claim 2, wherein the test statistic is $$\Lambda_N = \sum_{i=1}^{N} (|r_i|^2 - \Delta),$$

where N is the number of received samples, $r_i$ is the $i^{th}$ received sample, and $\Delta$ is the constant.

4. The method of claim 1, wherein said step of applying comprises squaring the amplitude of the samples.

5. The method of claim 1, wherein the constant satisfies $\sigma_w^2 < \Delta < \sigma_w^2(1+SNR_m)$, where $\sigma_w^2$ is the noise variance and $SNR_m$ is the minimum acceptable signal-to-noise ratio according to error probability specifications.

6. The method of claim 1, further comprising the step of adjusting thresholds to meet design specifications.

7. The method of claim 6, further comprising the steps of calculating false alarm and misdetection probabilities to determine whether a particular set of thresholds meets design specifications.

8. The method of claim 7, wherein the false alarm probability is calculated as $$P_{FA,M} = \sum_{N=1}^{M} P_{H_0}(E_N),$$

where M is a maximum number of samples and $P_{H_0}(E_N)$ is the probability of the event $E_N$ under the null hypothesis $H_0$.

9. The method of claim 7, wherein the misdetection probability is calculated recursively.

10. A system for determining whether a given electromagnetic frequency is in use, comprising:

a transformation module configured to transform an amplitude of received samples;

an adjustment module configured to adjust the transformed samples by a constant based on a minimum detection signal-to-noise ratio and to combine the adjusted samples to produce a test statistic; and a test module configured to use make a determination using a processor as to whether the frequency is in use based on whether the test statistic has exceeded or has fallen below a threshold and, if a number of received samples reaches a maximum number of samples, to make a determination regarding whether the frequency is in used based on whether the test statistic is above or below a final threshold.

11. The system of claim 10, wherein the adjustment module includes a subtracter configured to subtract the constant from each squared sample.

12. The system of claim 11, wherein the test statistic is $$\Lambda_N = \sum_{i=1}^{N} (|r_i|^2 - \Delta),$$

where N is the number of received samples, $r_i$ is the $i^{th}$ received sample, and $\Delta$ is the constant.

13. The system of claim 10, wherein the constant satisfies $\sigma_w^2 < \Delta < \sigma_w^2(1+SNR_m)$, where $\sigma_w^2$ is the noise variance and $SNR_m$ is the minimum acceptable signal-to-noise ratio according to error probability specifications.

14. The system of claim 10, further comprising a threshold adjustment module configured to set thresholds to meet design specifications.

15. The system of claim 14, wherein the threshold adjustment module is configured to calculate false alarm and misdetection probabilities to determine whether a particular set of thresholds meets design specifications.

16. The system of claim 15, wherein the false alarm probability is calculated as $$P_{FA,M} = \sum_{N=1}^{M} P_{H_0}(E_N),$$

where M is a maximum number of samples and $P_{H_0}(E_N)$ is the probability of the event $E_N$ under the null hypothesis $H_0$.

17. The method of claim 15, wherein the misdetection probability is calculated recursively.

18. A computer readable medium storing a computer readable program, wherein the computer readable program when executed on a computer causes the computer to:

calculate a test statistic based on the magnitude of a set of received samples adjusted by a constant;

make a determination regarding whether a frequency is in use based on whether the test statistic has exceeded or has fallen below a threshold; and if a number of received samples reaches a maximum number of samples, make a determination regarding whether the frequency is in used based on whether the test statistic is above or below a final threshold.

* * * * *